(12) United States Patent
Hatano et al.

(10) Patent No.: US 6,807,571 B2
(45) Date of Patent: Oct. 19, 2004

(54) INFORMATION RETRIEVAL SYSTEM WITH A SEARCH ASSIST SERVER

(75) Inventors: Ichiro Hatano, Tokyo (JP); Koji Koga, Tokyo (JP); Toshiaki Nakano, Tokyo (JP)

(73) Assignees: Pioneer Corporation, Tokyo (JP); Increment P Corporation, Tokyo (JP)

( * ) Notice: Subject to any disclaimer, the term of this patent is extended or adjusted under 35 U.S.C. 154(b) by 0 days.

(21) Appl. No.: 09/379,636

(22) Filed: Aug. 24, 1999

(65) Prior Publication Data

US 2003/0088637 A1 May 8, 2003

(30) Foreign Application Priority Data

Aug. 25, 1998 (JP) ............................................ 10-238399
May 10, 1999 (JP) ............................................ 11-128767

(51) Int. Cl.$^7$ ........................... G06F 15/16; G06F 17/30
(52) U.S. Cl. .................. 709/219; 379/93.25; 707/104.1
(58) Field of Search ................................ 709/216, 217, 709/219; 701/1, 200, 201, 43; 707/104.1, 3; 715/501.1; 379/93.25, 93.01

(56) References Cited

U.S. PATENT DOCUMENTS

| | | | | |
|---|---|---|---|---|
| 5,923,738 A | * | 7/1999 | Cardillo et al. | 379/93.25 |
| 6,111,541 A | * | 8/2000 | Karmel | 342/357.13 |
| 6,199,099 B1 | * | 3/2001 | Gershman et al. | 709/203 |
| 6,202,060 B1 | * | 3/2001 | Tran | 707/3 |
| 6,249,252 B1 | * | 6/2001 | Dupray | 342/450 |
| 6,317,718 B1 | * | 11/2001 | Fano | 705/1 |
| 6,353,743 B1 | * | 3/2002 | Karmel | 455/456 |
| 6,356,905 B1 | * | 3/2002 | Gershman et al. | 707/10 |

FOREIGN PATENT DOCUMENTS

WO        WO 97/07467        2/1997

OTHER PUBLICATIONS

Klaus Tochtermann et al., "Using Semantic, Geographical, and Temporal Relationships to Enhance Search and Retrieval in Digital Catalogs," *Proc. First European Conference on Research and Advanced Technology for Digital Libraries*, Pisa, Sep. 1997, pp. 73–86.

* cited by examiner

*Primary Examiner*—Dung C. Dinh
(74) *Attorney, Agent, or Firm*—Morgan, Lewis & Bockius LLP

(57) ABSTRACT

An information retrieval system which can search for requested information by an easy operation. Together with a plurality of information servers, a search assisting server having list data constructed by a list of identifiers to access each of the information servers is connected to an information network. In response to a designation of a requested item by an information retrieval terminal, the identifier corresponding to the requested item is searched for from the list data held in the search assisting server. An access to the information network is made by the searched identifier, thereby obtaining the requested information page.

10 Claims, 12 Drawing Sheets

FIG.2

| NAME OF HOTEL | LOCATION INFORMATION | INTRODUCING INFORMATION | URL |
|---|---|---|---|
| A HOTEL | (X1, Y1) | ALL ROOMS OCEAN-VIEW | http://www.###.co.jp/homepage/ahotel/intro.htm |
| B HOTEL | (X2, Y2) | MOUNTAIN HUT -STYLE LODGE | http://www.???.co.jp/homepage/bhotel/intro.htm |
| C HOTEL | (X3, Y3) | WITH PRIVATE BEACH | http://www.%%.co.jp/homepage/chotel/intro.htm |
| D HOTEL | (X4, Y4) | WITH LADY'S PLAN | http://www.¥¥¥.co.jp/homepage/dhotel/intro.htm |

FIG.3

| URL SPECIFIC NO. | NAME OF HOTEL | URL |
|---|---|---|
| 1 | A HOTEL | http://www.###.co.jp./homepage/ahotel/intro.htm |
| 2 | B HOTEL | http://www.???.co.jp./homepage/bhotel/intro.htm |
| 3 | C HOTEL | http://www.%%%.co.jp./homepage/chotel/intro.htm |
| 4 | D HOTEL | http://www.¥¥¥.co.jp./homepage/dhotel/intro.htm |
| --- | --- | --- |

| URL SPECIFIC NO. | NAME OF HOTEL |
|---|---|
| 1 | A HOTEL |
| 2 | B HOTEL |
| 3 | C HOTEL |
| 4 | D HOTEL |

FIG. 8

| URL SPECIFIC NO. | NAME OF FACILITY | PRONUNCIATION | CONTENTS OF FACILITY | TELEPHONE NO. | LOCATION INFORMATION | | HOMEPAGE URL |
|---|---|---|---|---|---|---|---|
| | | | | | ADDRESS | | |
| 1 | A HOTEL | [éi houtél] | 02: ACCOMODATIONS | xxx-xxxx-xxxx | (X1,Y1) | ...TOKOROZAWA-SHI, SAITAMA-KEN | http://www.&&&.co.jp./hotel/ahotel.htm |
| 2 | THEATER P | [thíətə píː] | 03: MOVIE THEATER | xxx-cccc-vvvv | (X2,Y2) | ...MEGURO-KU, TOKYO | http://www.???.co.jp./cinema/tp.htm |
| 3 | A DEPARTMENT STORE | [éi dipáːrtmənt stóːr] | 01: DEPARTMENT STORE | yyy-vvvv-cccc | (X3,Y3) | ...TOKOROZAWA-SHI, SAITAMA-KEN | http://www.%%%..co.jp./depart/adepart.htm |
| 4 | B DEPARTMENT STORE | [bíː dipáːrtmənt stóːr] | 01: DEPARTMENT STORE | xxx-ccvv-ccvv | (X4,Y4) | ...TOSHIMA-KU, TOKYO | http://www.¥¥¥.co.jp./depart/bdepart.htm |

FIG.9

| CONTENTS OF FACILITY | | URL FOR LISTING | PILOT URL |
|---|---|---|---|
| 01: | | http://www.###.co.jp/depart/ichiran/ | http://www.dia.co.jp/depart/academy.htm |
| 02: | | http://www.###.co.jp/hotel/ichiran/ | http://www.jia.co.jp/hotel/academy.htm |
| 03: | | http://www.###.co.jp/cinema/ichiran/ | http://www.pea.co.jp/cinema/academy.htm |
| 04: | | http://www.###.co.jp/amuse/ichiran/ | http://www.pea.co.jp/amuse/academy.htm |

DEPARTMENT STORE
ACCOMODATIONS
MOVIE THEATER
AMUSEMENT PARK

FIG.10

| URL SPECIFIC NO. | NAME OF FACILITY | PRONUNCIATION | CONTENTS OF FACILITY | TELEPHONE NO. | LOCATION INFORMATION |
|---|---|---|---|---|---|
| 1 | A HOTEL | [éi houtél] | 02 : | xxx-xxxx-xxxx | (X1, Y1) |
| 2 | THEATER P | [thiətə pi:] | 03 : | xxx-cccc-vvvv | (X2, Y2) |
| 3 | | | 01 : | yyy-vvvv-cccc | (X3, Y3) |
| 4 | | | 01 : | xxx-ccvv-ccvv | (X4, Y4) |

02 : ACCOMODATIONS
03 : MOVIE THEATER
01 : DEPARTMENT STORE
01 : DEPARTMENT STORE

A DEPARTMENT STORE [éi dipá:rtmənt stó:r]
B DEPARTMENT STORE [bi: dipá:rtmənt stó:r]

INFORMATION RETRIEVAL SYSTEM WITH A SEARCH ASSIST SERVER

BACKGROUND OF THE INVENTION

1. Field of the Invention

The invention relates to an information retrieval system for obtaining desired information from an information data server connected to a network.

2. Description of Related Art

Presently, information retrieval systems for obtaining desired information by using the Internet or the like have been established.

To obtain information of, for example, a hotel by using the information retrieval system, a typical user operation is as follows. The user first makes an access to a WWW (World Wide Web) server by using a communication terminal apparatus such as a personal computer (hereinafter, abbreviated to "PC") or the like, and then opens a home page of a search engine. Subsequently, the user selects a hotel existing in a desired region from a plurality of selection items shown in the home page or directly designates a hotel by entering a character string by using a keyboard or the like. Then a list of names of the hotels existing in the desired region is displayed in response to the designation of the hotel, and the user can finally obtain information regarding the desired hotel by further selecting a desired hotel name from the displayed list.

In the conventional information retrieval system, as mentioned above, a number of designation operations are required until the desired information is obtained. This causes a problem of poor operability, particularly when a retrieval system having a limited function such as a vehicle-mounted system is used.

OBJECT AND SUMMARY OF THE INVENTION

The invention has been derived to solve the above problem and it is an object of the invention to provide an information retrieval system by which desired information can be retrieved with an easy operation.

According to the invention, there is provided an information retrieval system which comprises an information network, a plurality of information servers connected to the information network, and an information retrieval terminal connected to the information network, wherein the information retrieval system further comprises a search assisting server connected to the information network, in which list data constituted by a list of identifiers to make access to information pages stored in each of the information server is stored, the identifier corresponding to a desired item is searched for from the list data stored in the search assisting server in response to the designation of the desired item by the information retrieval terminal, and an access to the information network is made by the retrieved identifier, thereby obtaining the information page corresponding to the desired item.

BRIEF DESCRIPTION OF THE DRAWINGS

FIG. 2 is a diagram showing a part of a hotel information page stored in a WWW server 11;

FIG. 3 is a diagram showing an example of URL list data constructed in a URL search assisting server 12;

FIG. 8 is a diagram showing another example of URL list data constructed in the URL search assisting server 12;

FIG. 9 is a diagram showing an example of URL list data per facility content constructed in the URL search assisting server 12;

FIG. 10 is a diagram showing an example of URL list data constructed in a memory device built in the navigation apparatus 93;

DETAILED DESCRIPTION OF THE PREFERRED EMBODIMENT

Figure 1:
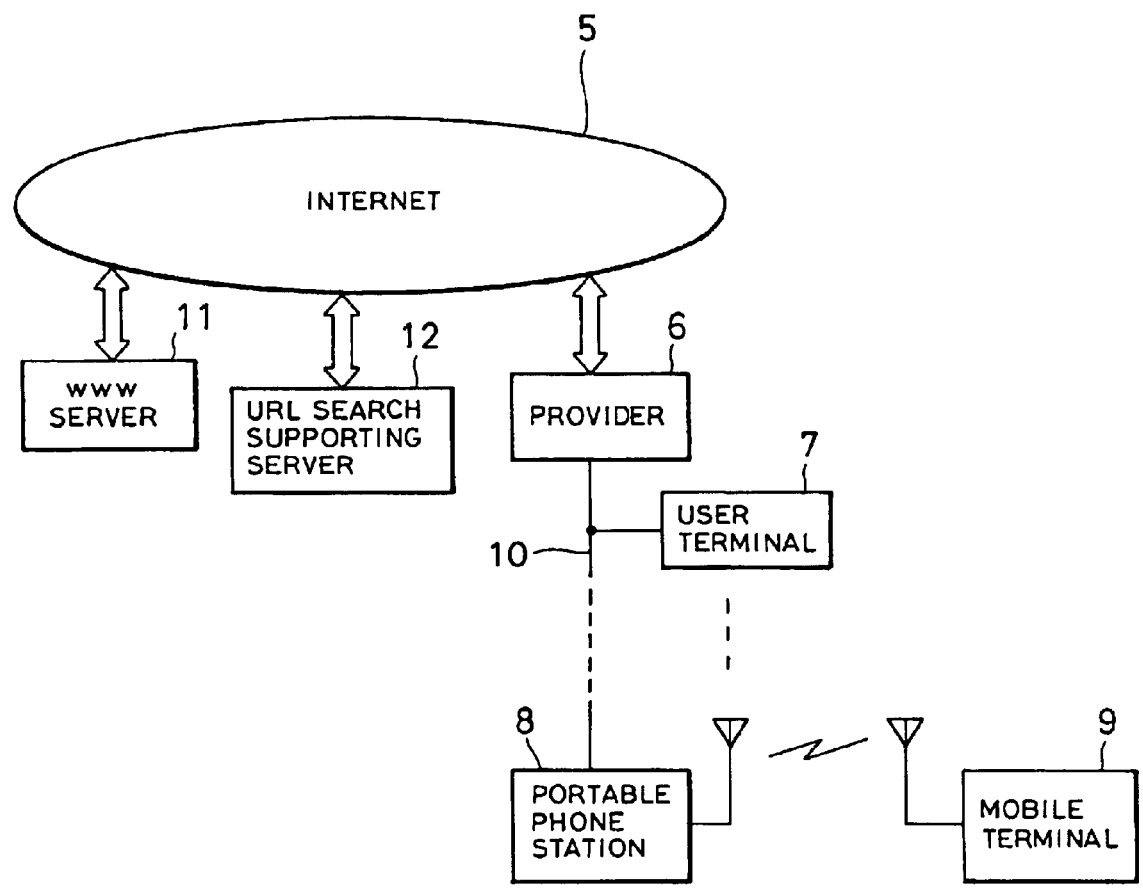
FIG. 1 is a diagram showing a construction of an information retrieval system according to the invention.

FIG. 1 is a diagram showing the construction of an information retrieval system according to the invention.

In FIG. 1, for example, as shown in FIG. 2, a hotel information page is constructed in a WWW (World Wide Web) server 11 connected to Internet 5, in which a plurality of hotel names, location information of each hotel, introduction information, and URLs (Uniform Resource Locators) as identifiers for providing access to an information page provided by each hotel are shown so as to indicate the mutual correspondence of each items.

A URL search assisting server 12 makes an access to the WWW server 11, obtains the hotel information page, and forms a URL list data in which URL specifying numbers have been allocated to a list comprising the hotel names and the URLs of the hotels on the basis of the hotel information page as shown in FIG. 3. The URL list data can be formed every land mark (hotel, building of public organization, station, etc.).

A provider 6 connects a plurality of user terminals 7 and portable phone stations 8 to the WWW server 11 and URL search assisting server 12 on the Internet 5 through a telephone line 10. The portable phone station 8 connects, for example, a mobile terminal 9 mounted in a vehicle and the telephone line 10 by a radio communication.

A number of information servers and providers (not shown) besides the WWW server 11, URL search assisting server 12, and provider 6 are connected to the Internet 5.

The mobile terminal 9 is an information retrieval terminal having a navigation function to detect its present location.

Figure 4:
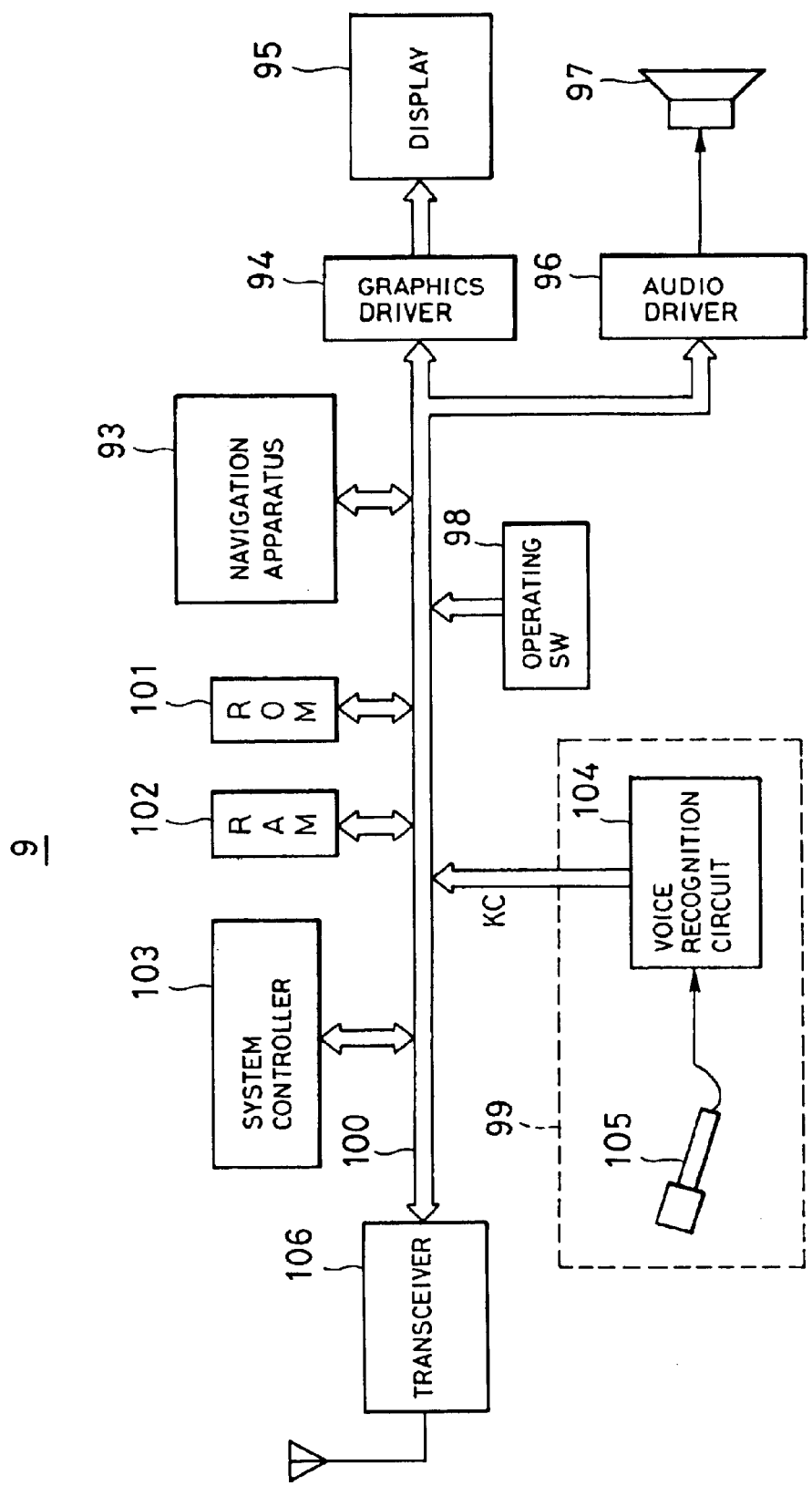
FIG. 4 is a diagram showing the internal construction of a mobile terminal 9.

FIG. 4 is a diagram showing an internal construction of the mobile terminal 9.

In FIG. 4, various sensors (not shown) for detecting a present running azimuth, a present angular velocity, and a present run distance of the vehicle and a GPS (Global Positioning System: not shown) to detect an absolute existing location (latitude and longitude information) of the vehicle by using radio wave transmitted from a positioning satellite are provided for a navigation apparatus 93. Map data of each region in the entire country has been stored in a memory (not shown) built in the navigation apparatus 93. In addition to roads, railroads, and public institution, the map data also includes information to be used to draw names and locations of the facilities such as gas stations, convenience stores, hotels, and the like.

Figures 5, 6:
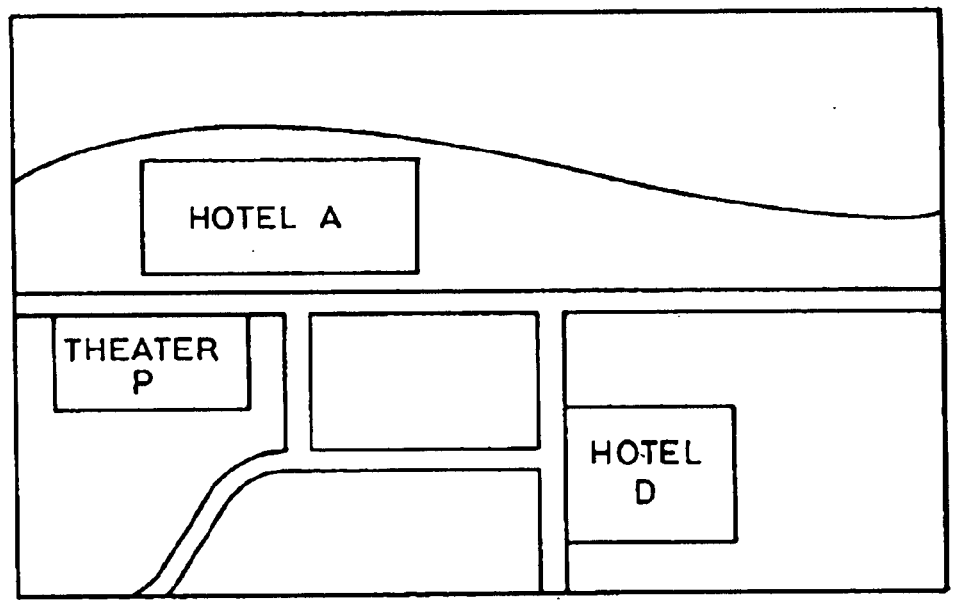
FIG. 5 is a diagram showing storage contents (all of the hotel names registered in map data and URL specifying numbers) in a memory built in a navigation apparatus 93.
FIG. 6 is a diagram showing an example of a map display.

As shown in FIG. 5, all of the names of the hotels registered in the map data and URL specifying numbers (the number corresponding to URL of an information page provided by each hotel) are stored in the memory so as to correspond to each other.

The navigation apparatus 93 obtains the present location of the vehicle on the basis of detection information from each of the detecting means and sends present running map data to a system bus 100, in which the present running map data is formed by drawing a point showing the present location to the map data of a predetermined region including the present location. A graphics driver 94 converts the present running map data into image data and supplies it to a display 95. Map image shown by the present running map data is, therefore, displayed on the picture plane of the display 95. The navigation apparatus 93 transmits the present running situation and various audio data to instruct "right turn" or "left turn" at a junction point such as an intersection or the like by a voice sound onto the system bus 100. An audio driver 96 converts the audio data into an analog audio signal and allows it to be generated as an acoustic sound from a speaker 97.

An operating switch 98 transmits various operation command signals according to the switching operation of the user to the system bus 100. A voice input apparatus 99 is constructed by a microphone 105 and a voice recognizing circuit 104. The microphone 105 converts the voice sound of the user into an electric signal and supplies a resultant audio signal to the voice recognition circuit 104. The voice recognition circuit 104 discriminates an operation command shown by the audio signal and transmits an operation command signal corresponding to the operation command onto the system bus 100. The navigation apparatus 93 performs the operation according to various operation command signals sent onto the system bus 100 by the operating switch 98 or voice input apparatus 99.

A transceiver 106 receives a radio wave transmitted from the portable phone station 8 by a wireless method and transmits the signal obtained by demodulating the received radio wave onto the system bus 100. The transceiver 106 modulates various command signals sent onto the system bus 100 and transmits the modulated signals to the portable phone station 8 in a wireless manner.

Also connected to the system bus 100n, is a ROM (Read Only Memory) 101, a RAM (Random Access Memory) 102, and a system controller 103 for controlling various operations of the navigation apparatus 93 and performing a control operation to permit information retrieval (which will be explained later).

The information retrieving operation is executed in order to obtain the information regarding the hotels existing in a desired region is retrieved by the mobile terminal 9 in a manner described hereinafter.

First, by operating the navigation apparatus 93, the user causes the display of, for example, a map image of a desired region as shown in FIG. 6 in the display 95.

The user subsequently designates a desired hotel among the hotels displayed on the map image. As methods of designating the hotel, there is a method of designating the hotel by a pointing device from the picture plane of the display 95 or a method such that the user utters a desired hotel name which is received by the voice input apparatus 99. It is also possible to use a method such that item selecting means for selecting a desired one of the items such as hotel, parking lot, landmark, and the like is provided for the navigation apparatus 93, a list of hotel names is displayed on the picture plane of the display 95 in accordance with the selection (the selecting operation of the user) of the hotel item, and a desired hotel is designated from the list by means of a cursor.

Figure 7:
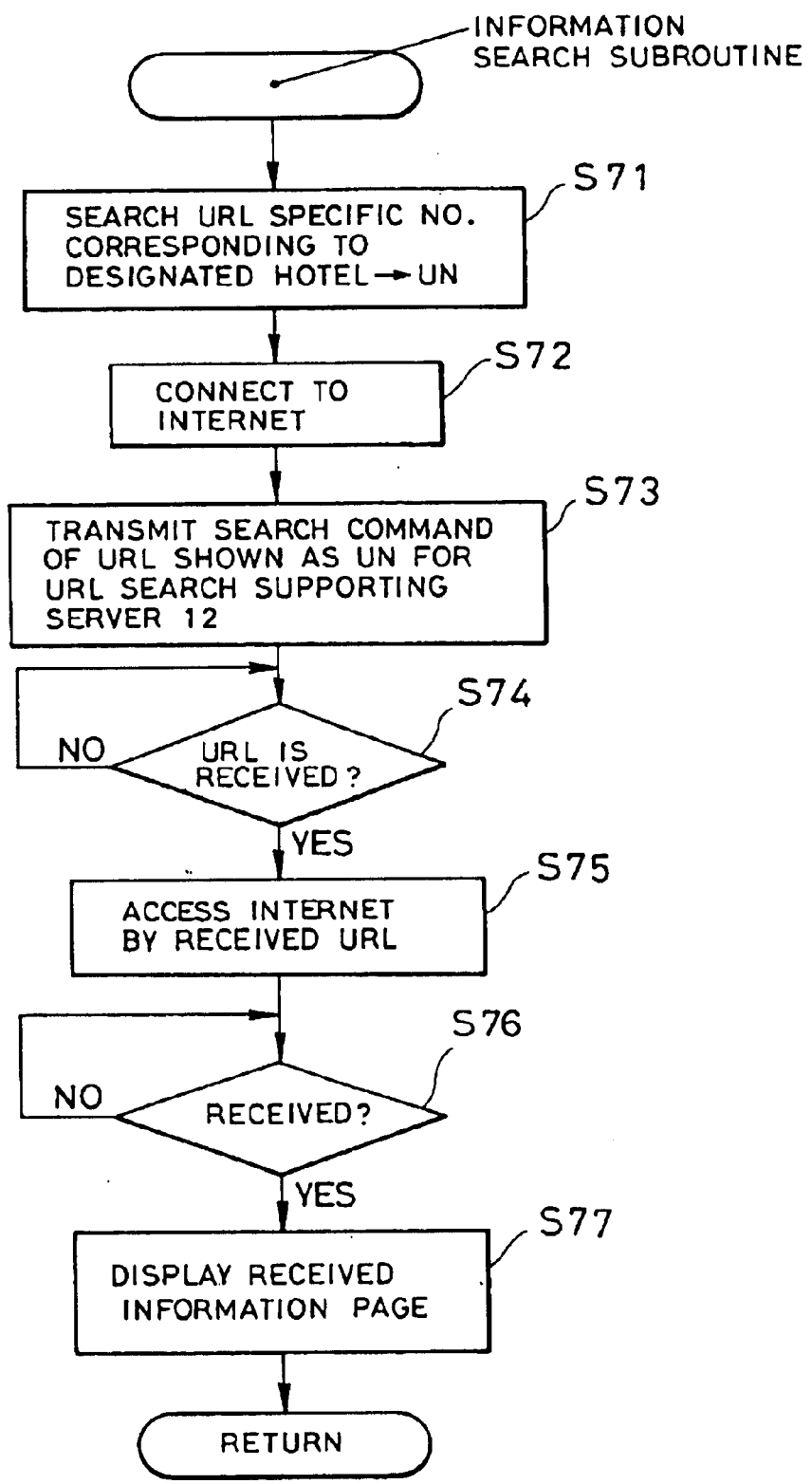
FIG. 7 is a diagram showing an information retrieval subroutine which is used in the information retrieval system of the invention.

After completion of the designation for the desired hotel as mentioned above, the system controller 103 starts to execute an information retrieval subroutine as shown in FIG. 7 in accordance with software which has previously been stored in the ROM 101.

In FIG. 7, the system controller 103 first searches for a URL specifying number corresponding to the hotel designated as mentioned above from the information stored in the memory built in the navigation apparatus 93 as shown in FIG. 5 and allows it to be stored as a URL specifying number UN in a predetermined area in the RAM 102 (step S71). For example, when the user designates a hotel D from the picture plane of FIG. 6, the system controller 103 searches for "4" as a URL specifying number UN with reference to the contents as shown in FIG. 5.

The system controller 103 subsequently supplies a connection instruction signal and the telephone number of the provider 6 to the transceiver 106 through the system bus 100 (step S72) in order to connect to the Internet. By the execution of step S72, the transceiver 106 calls the provider 6 as a destination of the telephone number in a wireless manner and requests the connection to the Internet.

After completion of the connection to the Internet, the system controller 103 accesses the URL search assisting server 12 and transmits a command for searching for the URL corresponding to the URL specifying number UN to the URL search assisting server 12 (step S73). The URL search assisting server 12 searches for the URL corresponding to the URL specifying number shown by the URL specifying number UN from the URL list data constructed as shown in FIG. 3 and transmits the searched URL to the mobile terminal 9 through the provider 6 and portable phone station 8. During this period, the system controller 103 performs a discrimination about whether the transceiver 106 has received the URL transmitted from the URL search assisting server 12 or not until the URL is received (step S74).

When the reception of the URL is confirmed in step S74, an information request signal to obtain the information page shown by the received URL from the Internet 5 is supplied from the system controller 103 to the transceiver 106 via the system bus 100 (step S75). By executing step S75, the information request signal is transmitted to the provider 6 through the portable phone station 8 and telephone line 10. In this instance, the provider 6 accesses the server shown by the information request signal from among a plurality of servers connected to the Internet 5 and reads out the information page shown by the URL from the server. The provider 6 transmits the read-out information page to the mobile terminal 9 through the telephone line 10 and portable phone station 8.

For example, when the mobile terminal 9 requests the information page by the URL http://www.¥¥¥.co.jp./homepage/dhotel/intro.htm corresponding to the URL specifying number "4" in FIG. 3 in step S75, the information page regarding the "D hotel" is transmitted to the mobile terminal 9.

Until the information page is received by the transceiver 106, the system controller 103 in the mobile terminal 9 discriminates whether the information page has been received or not (step S76). When it is determined in step S76 that the information page has been received, the system controller 103 supplies the information page to the graphics driver 94 and allows the contents of the information page to be displayed on the picture plane of the display 95 (step S77).

The contents of the information page has a high updating frequency. For example, in the case of the contents regarding the hotel or a parking lot as mentioned above, there is content about available/availability of a vacancy or vacant space. In the case of an event, there is a content as to whether the event is presently open, or the like.

In the information retrieval system shown in FIGS. 1 and 7 as mentioned above, first, the URL corresponding to each of a plurality of information pages which would be requested by the user is preliminarily constructed in the URL search assisting server 12 as list data as shown in FIG. 3. In this instance, when a desired item (hotel) is designated at the mobile terminal 9, the URL search assisting server 12 searches for the URL of the information page corresponding to the designated item from the list data and transmits it to the mobile terminal 9. The mobile terminal 9 obtains the desired information page by accessing the Internet by the URL transmitted from the URL search assisting server 12.

The user who operates the mobile terminal 9 as an information retrieval terminal can immediately obtain desired information pages without performing the designating operation so often.

Although the embodiment has been described with respect to an example of the operation when the mobile terminal 9 is used as an information retrieval terminal, the invention can be similarly embodied at the user terminal 7.

In the embodiment, although hotel information has been mentioned as an example of the list data which is constructed in the URL search assisting server 12, the invention is not so limited. For example, it is also possible to construct list data regarding various facilities such as accommodations, movie theaters, and department stores. Further, although the URL search assisting server 12 in the embodiment transmits only the URL of the information page of the facility designated by the user, what is called a home page, to the mobile terminal 9, the invention is not so limited and the URL of a related information page can be transmitted.

FIGS. 8 and 9 are diagrams showing examples of the URL list data constructed by the URL search assisting server 12 made in consideration of the above points. FIG. 10 is a diagram showing URL list data which has previously been stored in a memory device (not shown) built into the navigation apparatus 93.

As shown in FIG. 8, URL list data is constructed in the URL search assisting server 12, in which various facilities existing on the map and various facility information (namely, a pronunciation of the facility, contents, a telephone number, location information on the map data, address, and URL to make access to the home page which is provided by each facility) regarding each of the facilities are made to correspond to each other. Further, as shown in URL list data per facility content of FIG. 9, the URL search assisting server 12 constructs facility contents, a URL of a page on which a list of facilities having contents similar to the facility contents that have been shown, and a URL of the home page representing the facility contents that correspond to each other. By periodically making access to the Internet 5, the URL search assisting server 12 updates each facility existing on the map data and various information regarding those facilities.

In the URL list data which has previously been constructed in the memory device built into the navigation apparatus 93, each facility existing on the map data, the URL specifying number, and various facility information comprising the pronunciation of each facility, facility contents, telephone number, location information on the map data, and the like are made to correspond to each other.

The user designates a desired facility among the facilities existing on the map image displayed on the display 95. As a method of designating the facility, various methods other than the method of designating a desired or requested facility from the map image displayed on the display 95 as mentioned above are considered.

For example, on the information retrieval terminal (mobile terminal 9 or user terminal 7) side, a menu picture plane for searching for the facility is first displayed on the display 95. When the user performs the operation to execute the facility search from the menu picture plane, the information retrieval terminal subsequently allows the URL list data itself as shown in FIG. 10 to be displayed on the display 95. The user designates at least one of the telephone number, facility name, and pronunciation from the URL list data, thereby designating the facility from which he wants information.

Figure 11:
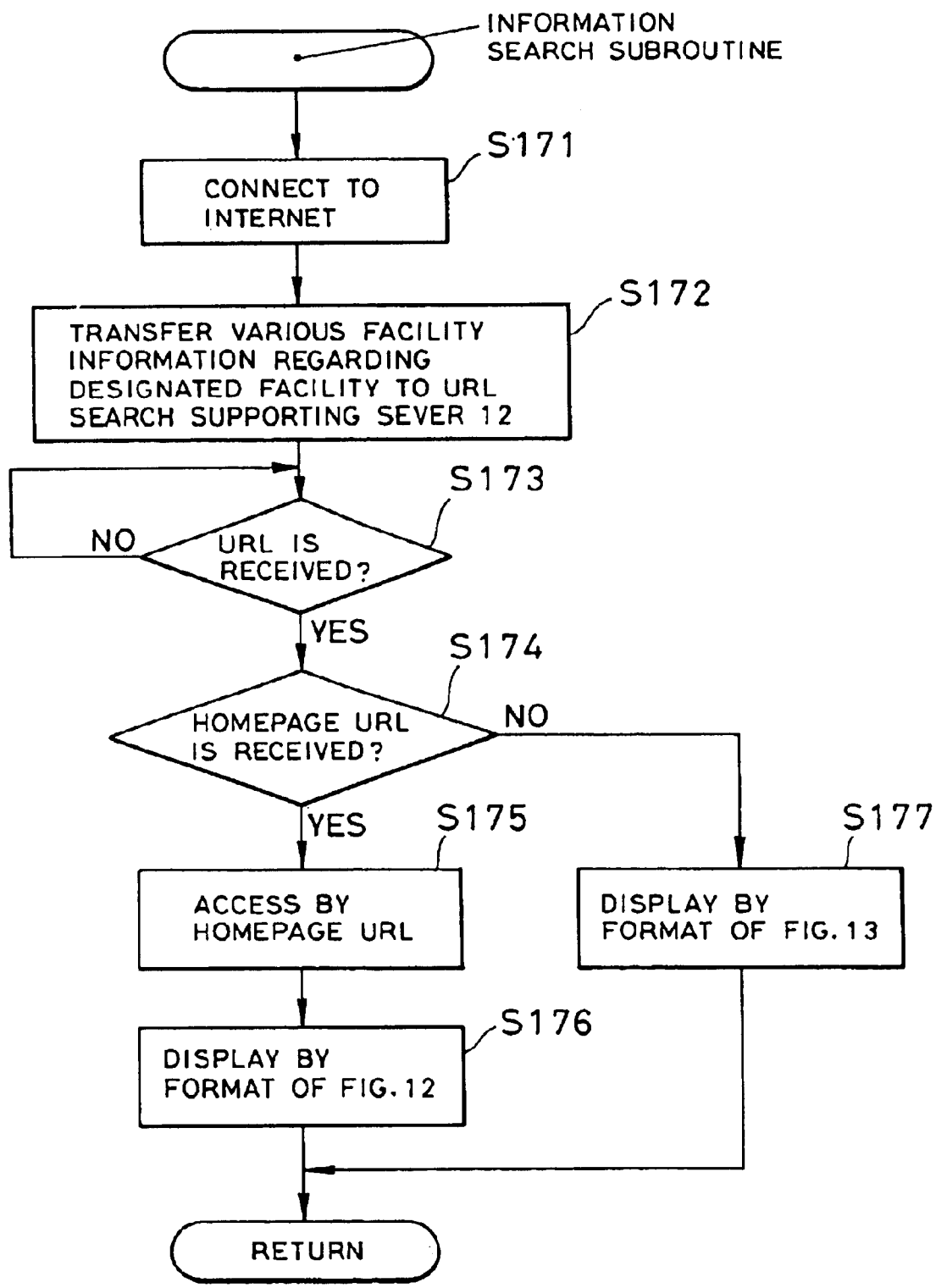
FIG. 11 is a diagram showing another example of the information retrieval subroutine which is used in the information retrieval system of the invention.

When the user designates the facility as mentioned above and requests the information page regarding the facility through the Internet, the system controller 103 exits the operation of the main flow which is at present being executed and starts to execute an information retrieval subroutine as shown in FIG. 11.

In FIG. 11, first, the system controller 103 supplies a connection instruction signal and the telephone number of the provider 6 to the transceiver 106 via the system bus 100 so as to connect to the Internet 5 (step S171). By executing step S171, the transceiver 106 calls the provider 6 as a destination of the telephone number in a wireless manner, thereby requesting the connection to the Internet 5. After completion of the connection to the Internet, the system controller 103 selects various facility information regarding the facility designated by the user from the URL list data stored in the memory device built into the navigation apparatus 93 as shown in FIG. 10 and transfers the information to the URL search assisting server 12 (step S172). For example, when the user designates "Theater P" on the picture plane of FIG. 6, the system controller 103 selects various facility information corresponding to "Theater P", namely,

| | |
|---|---|
| URL specific No. | 2 |
| Name of facility | Theater P |
| Pronunciation | [thiətəpi:] |
| Contents of facility | Movie theater (code 03) |
| Telephone No. | xxx-cccc-vvvv |
| Location information | (X2, Y2) | from the URL list data as shown in FIG. 10 and transfers the information to the URL search assisting server 12.

In accordance with the selected facility information, the URL search assisting server 12 first searches for the data which coincides with the various facility information transferred as mentioned above from the URL list data constructed as shown in FIG. 8, thereby obtaining the facility designated by the user and various facility information regarding the designated facility. The URL search assisting server 12 subsequently extracts a home page URL from the obtained various facility information and transmits it to the mobile terminal 9 via the provider 6 and portable phone station 8. If the URL search assisting server 12 cannot retrieve the data which coincides with the various facility information transferred from the mobile terminal 9 side from the URL list data shown in FIG. 8, it is determined that the home page URL of this facility has been updated or deleted, so that the home page URL is not transmitted.

The URL search assisting server 12 further selects "contents of facility" from the various facility information obtained as mentioned above, extracts a URL (URL for listing) of the page on which a list of facilities having the same facility contents as "contents of facility" is shown and a URL (pilot URL) of the home page representing the "contents of facility" themselves from the URL list data per facility content as shown in FIG. 9, and transmits the information to the mobile terminal 9.

For example, when it is determined that the facility designated by the user is "Theater P", the URL search assisting server 12 searches the home page URL of "Theater P" from the URL list data shown in FIG. 8 and transmits it to the mobile terminal 9. Further, the URL search assisting server 12 determines that the facility content of "Theater P" is "Movie theater" with reference to the various facility information regarding the facility designated by the user as mentioned above, extracts each of the URL for listing and pilot URL corresponding to "Movie theater" from the URL list data per facility content in FIG. 9, and transmits the information to the mobile terminal 9. The URL for listing corresponding to "Movie theater" is a URL of a page in which a list of movie theaters existing in each region is shown. The pilot URL corresponding to "Movie theater" is a URL of a home page presented by an organization which generally manages the movie theaters in the region or country.

Figure 12:
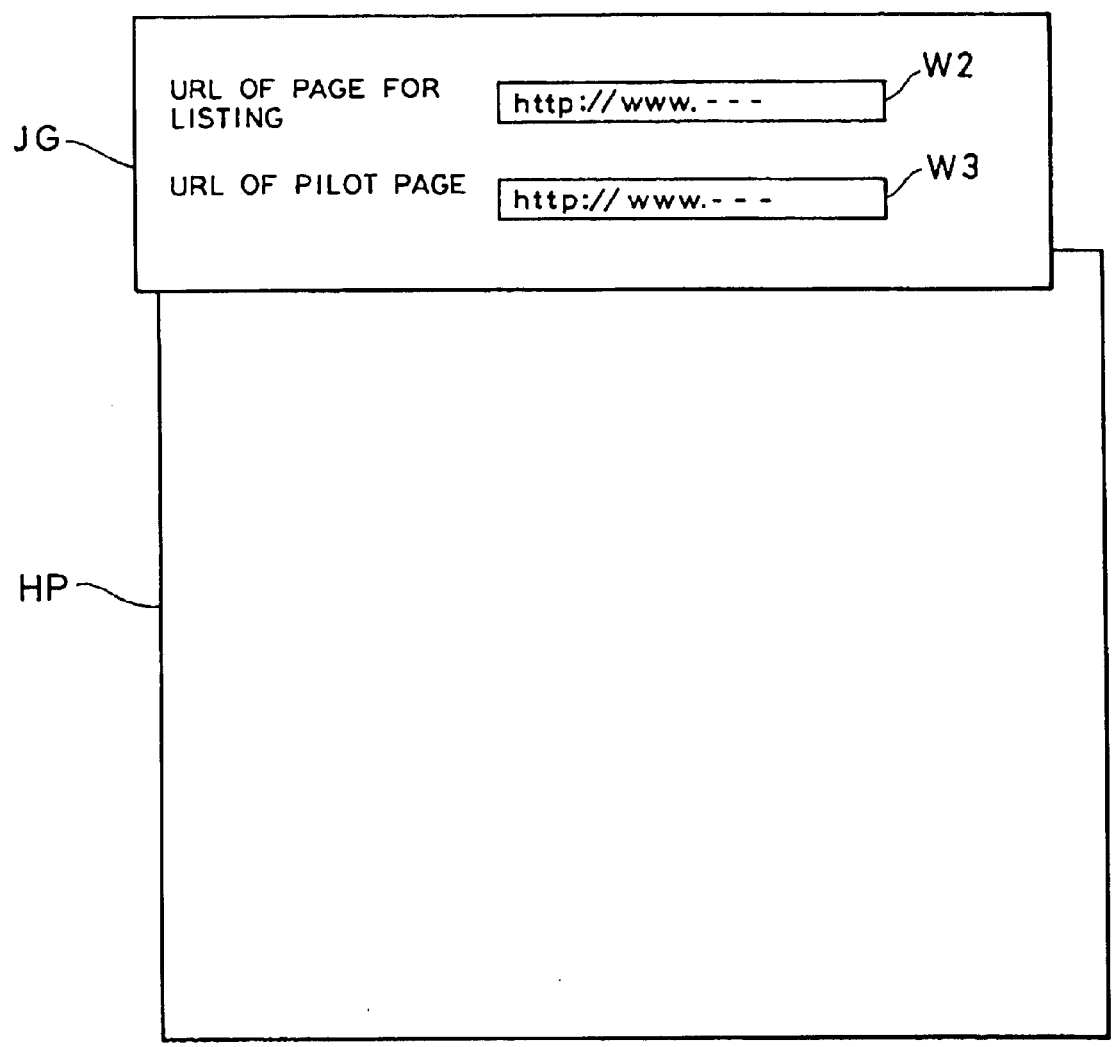
FIG. 12 is a diagram showing an example of a display image by a display 95 in the case where a home page URL is valid.

The system controller 103 performs a discrimination about whether the transceiver 106 has received the various URLs or not until the reception is completed (step S173). When the reception of each URL is confirmed in step S173, the system controller 103 subsequently discriminates whether the home page URL has been transmitted from the URL search assisting server 12 or not (step S174). If it is determined in step S174 that the home page URL has been transmitted, namely, when the home page URL of the facility designated by the user is valid, the system controller 103 connects to the Internet 5 so as to make access to the home page shown by the home page URL (step S175). When the data corresponding to the home page is sent according to the execution in step S175, the system controller 103 supplies an image signal to the graphics driver 94 in order to display the home page and the URL for listing and pilot URL which were received as mentioned above on the picture plane of the display 95 (step S176). For example, an image as shown in FIG. 12 is displayed on the picture plane of the display 95 by the execution of step S176. That is, the home page of the facility designated by the user as mentioned above is displayed in a window HP on the picture plane of the display 95. The URL of the page in which a list of facilities having the same contents as those designated by the user has been shown and the URL of the home page representing the facility content itself are displayed in each of the areas W2 and W3 in a window JG.

Figure 13:
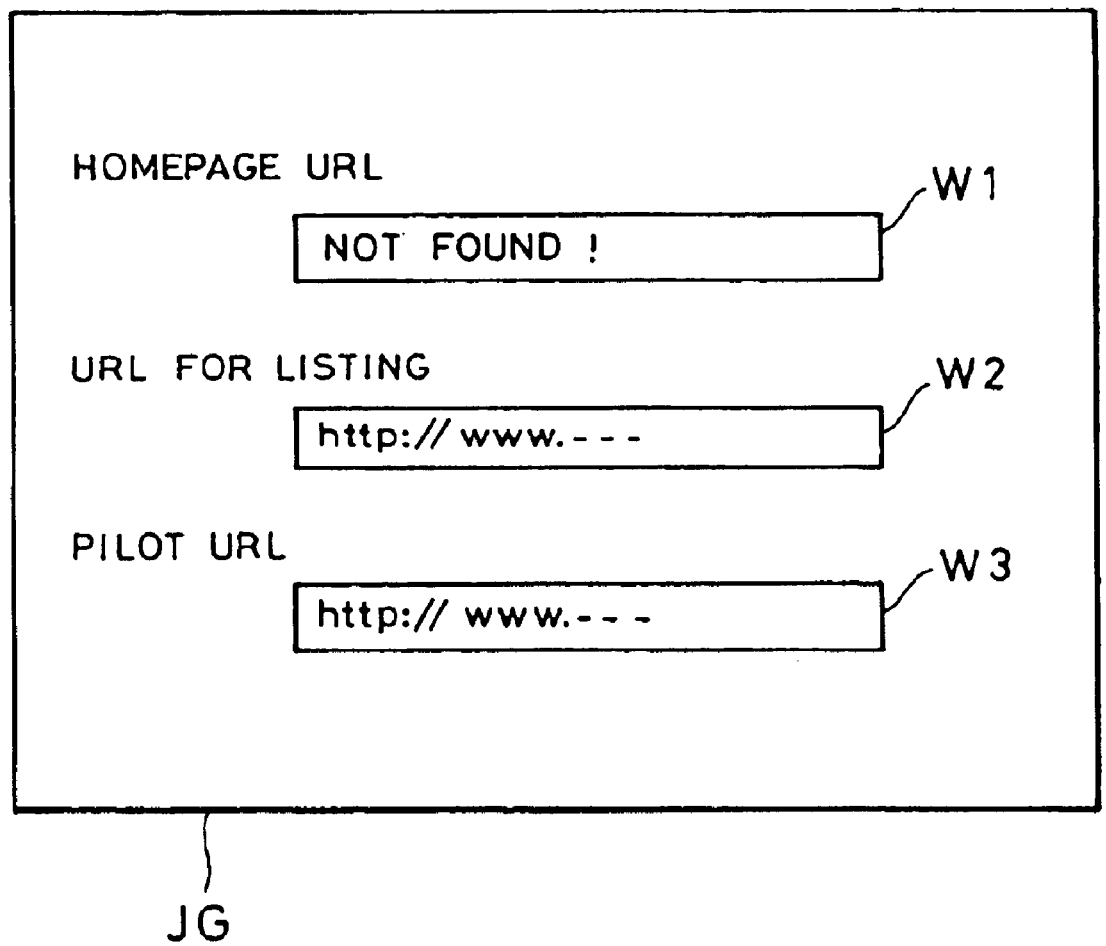
FIG. 13 is a diagram showing an example of a display image by the display 95 in the case where a home page URL is invalid.

When it is decided in step S174 that the home page URL is not sent, namely, if the home page URL of the facility designated by the user has been updated or deleted and is invalid, the system controller 103 supplies an image signal to display an image as shown in FIG. 13 on the display 95 to the graphics driver 94 (step S177). By the execution in step S177, for the home page URL of the facility designated by the user as mentioned above, as shown in FIG. 13, a message notifying that the home page could not be found is displayed in an area W1 in the window JG. Although the URL for the home page of the facility designated by the user could not be found, each of the URLs of the page in which a list of facilities having the same contents as those of the facility designated by the user is shown and the URL of the pilot home page representing the facility content itself is displayed in each of the areas W2 and W3 as shown in FIG. 13.

After completion of step S176 or S177, the system controller 103 exits the information retrieval subroutine as shown in FIG. 11 and returns to the main routine operation (not shown). When the user designates an arbitrary URL from the window JG shown in FIG. 12 or 13, the system controller 103 executes steps S75 to S77 shown in FIG. 7. The page in which a list of facilities having the same contents as those of the facility designated by the user is shown or the home page representing the facility content itself is, consequently displayed on the picture plane of the display 95.

According to the operation as mentioned above, therefore, even if the home page URL of the designated facility has been updated or deleted, in place of the home page URL, the URL of the page displaying a list of facilities having the same contents as those of the designated facility and the URL of the home page representing the facility content are automatically provided. The user, thus, can obtain desired information by accessing those pages if necessary.

It is also possible to use a construction such that list data comprising URLs of various TV programs is constructed in the URL search assisting server 12 and an information page of a desired TV program can be obtained in accordance with a request from the mobile terminal 9 (or user terminal 7) as an information retrieval terminal.

In this instance, the URL search assisting server 12 obtains program information of each region-date-channel number from the WWW server which provides the TV program information and forms list data in which the URL specifying number is allocated. On the mobile terminal 9 (or user terminal 7) side, the URL specifying number corresponding to the region-date-channel number as mentioned above is preset and a selection menu to designate the item comprising region-date-channel number is displayed. When the user designates a desired item, operations similar to those in steps S71 to S77 in FIG. 7 are executed in the mobile terminal 9 (or user terminal 7). The information page corresponding to the region-date-channel number designated by the user as mentioned above is displayed. In addition to the region-date-channel number, the date-channel number or date-time-channel number, or in place of those channel numbers, the URL of the program accumulated in the WWW server corresponding to the broadcasting station name or the like can be constructed in the URL search assisting server 12 in correspondence to the URL specifying number.

It is also possible to adopt a configuration such that list data comprising URLs for weather information of each region is provided in the URL search assisting server 12 and the weather information of a desired region can be obtained in accordance with a request from the mobile terminal 9 (or user terminal 7).

According to the present invention as described in detail above, URLs to be used as an identifier to make access a plurality of information pages which would be requested by the user are preliminarily formed as list data. On the side of the information retrieval terminal, the URL corresponding to an item is searched from the list data and an access to the Internet is made using the URL when a desired item is designated, thereby providing a desired or requested information page.

The user, therefore, can immediately open a desired or requested information page without performing a number of designating operations.

According to the present invention, since information can be searched without using any character string input means such as a keyboard, the troublesome work of entering characters can be avoided and an information retrieval function can be provided, for example, to a car navigation system in the absence of a keyboard.

What is claimed is:

1. An information retrieval system comprising:

an information network;

a plurality of information servers connected to said information network;

an information retrieval terminal connected to said information network, said information retrieval terminal employing a specifying number to specify an identifier corresponding to a requested item; and a search assisting server connected to said information network, wherein said search assisting server has list data of a list of: facility contents data; first identifiers to have access to information pages corresponding to facility contents; and second identifiers to have access to information pages representing facility contents, stored in each of said information servers connected to said information network, said search assisting server searches said list data for a first identifier and a second identifier that correspond to a requested item, in response to the designation of an information item as said requested item by said information retrieval terminal, using a specifying number, via the information network, and wherein said search assisting server is adapted to send said first identifier to said information retrieval terminal when the same item as a requested item designated by said information retrieval terminal exists in the list data, and to send a second identifier to have an access to an information page representing a facility content of said requested item to said information retrieval terminal when the same item as said requested item designated by said information retrieval terminal does not exist in the list data, and said information network is accessed by said searched out first or second identifier so as to obtain an information page corresponding to said requested item.

2. An information retrieval system as recited in claim 1, wherein wherein said information retrieval terminal is adapted to present a list of information items, each of said information items respectively being associated with each of said identifiers, and has list display means for displaying said list of information items, designating means for designating an information item among said information items as a requested item from said list of the information items, and transmitting means for transmitting said information item designated by said designating means to said search assisting server via the information network.

3. A system according to claim 2, wherein said information retrieval terminal includes a navigation apparatus for detecting a present location of a vehicle and displaying a map of a predetermined area, and said designating means designates a facility existing in the map display of said predetermined area as said item.

4. A system according to claim 1, wherein said information network is the Internet and said identifier is a URL.

5. A system according to claim 2, wherein said information network is the Internet and said identifier is a URL.

6. A system according to claim 2, wherein said information retrieval terminal includes means for displaying a menu for facility search, and said list display means displays a list of items showing each of said information pages in accordance with a predetermined operation from said menu for facility search.

7. An information retrieval system as recited in claim 1, wherein said list data comprises: first list data in which each of a name of a facility existing on a map, pronunciation of said facility, a telephone number of said facility, a first identifier to access an information page of said facility, and a facility content of said facility has been constructed for each said facility; and second list data in which a second identifier to access to an information page representing said facility content has been constructed for each said facility content, said requested item being at least one of the name of said facility, the pronunciation of said facility, and the telephone number of said facility.

8. A system according to claim 7, wherein said second list data includes a third identifier to access a facility list page in which a list of facilities having the same facility content as said facility content is shown, and when the same item as said requested item designated by said information retrieval terminal does not exist in said first list data, said facility content corresponding to said requested item is searched from said first list data, and each of said second and third identifiers corresponding to said searched facility content is searched from said second list data and displayed as an image.

9. A system according to claim 1, wherein said list data comprises: first list data in which each of a first identifier to access an information page of the facility existing on a map and a facility content of said facility has been constructed for each said facility; and second list data in which a second identifier to access an information page representing said facility content has been constructed for each said facility content, said search assisting server searches for each of said first identifier corresponding to said requested item and said facility content information from said first list data and searches for said second identifier corresponding to said searched facility content information from said second list data, and said information retrieval terminal accesses said information network by said first identifier searched for by said search assisting server and displays an image of said second identifier searched for by said search assisting server.

10. A system according to claim 9, wherein said second list data includes a third identifier to access a facility list page in which a list of facilities having the same facility content as said facility content is shown, said information retrieval terminal searches for each of said second and third identifiers corresponding to said facility content information retrieved from said first list data from said second list data, and said search assisting server accesses said information network by said first identifier searched for by said search assisting server and displays an image of each of said second and third identifiers searched by said search assisting server.

* * * * *